(12) United States Patent
Wagner et al.

(10) Patent No.: US 7,276,153 B2
(45) Date of Patent: Oct. 2, 2007

(54) METHOD FOR NEUTRALISING A STREAM OF HYDROCARBON FLUID

(75) Inventors: Rupert Wagner, Worms (DE); Randolf Hugo, Dirmstein (DE); Hans-Peter Schmid, Frankenthal (DE)

(73) Assignee: BASF Aktiengesellschaft, Ludwigshafen (DE)

(*) Notice: Subject to any disclaimer, the term of this patent is extended or adjusted under 35 U.S.C. 154(b) by 467 days.

(21) Appl. No.: 10/296,222

(22) PCT Filed: Jun. 8, 2001

(86) PCT No.: PCT/EP01/06503

§ 371 (c)(1),
(2), (4) Date: Dec. 3, 2002

(87) PCT Pub. No.: WO01/93986

PCT Pub. Date: Dec. 13, 2001

(65) Prior Publication Data

US 2003/0141223 A1 Jul. 31, 2003

(30) Foreign Application Priority Data

Jun. 9, 2000 (DE) ................. 100 28 637

(51) Int. Cl.
*C10G 29/22* (2006.01)

(52) U.S. Cl. ............ 208/240; 208/207; 208/833; 208/860; 95/172; 95/178

(58) Field of Classification Search ........... 208/207, 208/240; 585/833, 860; 95/172, 178
See application file for complete search history.

(56) References Cited

U.S. PATENT DOCUMENTS

| | | | | |
|---|---|---|---|---|
| 3,659,401 A | * | 5/1972 | Giammarco | ............ 95/175 |
| 4,336,233 A | | 6/1982 | Appl et al. | |
| 4,537,753 A | | 8/1985 | Wagner et al. | |
| 4,551,158 A | | 11/1985 | Wagner et al. | |
| 4,553,984 A | | 11/1985 | Volkamer et al. | |
| 4,999,031 A | | 3/1991 | Gerhardt et al. | |
| 5,061,465 A | * | 10/1991 | Carter | ............ 423/229 |
| 5,820,837 A | | 10/1998 | Marjanovich et al. | |

FOREIGN PATENT DOCUMENTS

| | | |
|---|---|---|
| CA | 1 290 553 | 10/1991 |
| CA | 1 291 321 | 10/1991 |
| CA | 1 295 810 | 2/1992 |
| DE | 1 542 415 | 4/1970 |
| DE | 1 904 428 | 8/1970 |
| EP | 0 160 203 | 11/1985 |
| EP | 270040 A2 * | 6/1988 |
| EP | 0 322 924 | 7/1989 |
| GB | 1 058 304 | 2/1967 |
| GB | 1 287 194 | 8/1972 |
| WO | WO 00/00271 | 1/2000 |

* cited by examiner

*Primary Examiner*—Tam M. Nguyen
(74) *Attorney, Agent, or Firm*—Oblon, Spivak, McClelland, Maier & Neustadt, P.C.

(57) ABSTRACT

In a process for deacidifying a fluid hydrocarbon stream which comprises carbon dioxide ($CO_2$) and/or other acid gases as impurities, the fluid stream is brought into intimate contact with an absorption liquid in an absorption or extraction zone (12), the substantially purified fluid stream and the absorption liquid which is loaded with $CO_2$ and/or other acid gases are separated from one another, and the absorption liquid is subsequently regenerated and then again fed to the absorption extraction zone (12). To regenerate the absorption liquid, the loaded absorption liquid is first expanded in a first low-pressure expansion stage (22) to a pressure of from 1 to 2 bar (absolute). The partially regenerated absorption liquid is then heated in a heat exchanger (20) and then, in a second low-pressure expansion stage (29), again expanded to a pressure of from 1 to 2 bar (absolute).

15 Claims, 3 Drawing Sheets

METHOD FOR NEUTRALISING A STREAM OF HYDROCARBON FLUID

The present invention relates to a process for deacidifying a fluid hydrocarbon stream which comprises carbon dioxide ($CO_2$) and/or other acid gases as impurities, in which the fluid stream is brought into intimate contact with an absorption liquid in an absorption or extraction zone, the substantially purified fluid stream and the absorption liquid which is loaded with $CO_2$ and/or other acid gases are separated from one another, and the absorption liquid is subsequently regenerated and then again fed to the absorption or extraction zone.

In numerous processes in the chemical industry, fluid streams occur which comprise acid gases, for example $CO_2$, $H_2S$, $SO_2$, $CS_2$, HCN, COS or mercaptans, as impurities. These fluid streams can be, for example, gas streams (such as natural gas, synthesis gas from heavy oil or heavy residues, refinery gas or reaction gases formed in the partial oxidation of organic materials, for example coal or petroleum), or liquid or liquefied hydrocarbon streams (such as LPG (liquefied petroleum gas) or NGL (natural gas liquids)). Before these fluids can be transported or further processed, the acid gas content of the fluid must be markedly decreased. $CO_2$, for example, must be removed from natural gas, since a high concentration of $CO_2$ reduces the heating value of the gas. In addition, $CO_2$, combined with water which is frequently entrained in the fluid streams, can lead to corrosion on pipes and fittings.

The removal of sulfur compounds from these fluid streams is of particular importance for various reasons. For example, the content of sulfur compounds in natural gas must be reduced directly at the natural gas source by suitable treatment measures, since the sulfur compounds also form acids in the water frequently entrained by the natural gas, which acids are corrosive. To transport the natural gas in a pipeline, therefore preset limit values of the sulfurous impurities must be complied with. In addition, numerous sulfur compounds, even at low concentrations, are foul smelling and, especially hydrogen sulfide ($H_2S$), toxic.

Therefore, numerous processes for removing acid gas constituents from fluid streams such as hydrocarbon gases, LPG or NGL have already been developed. In the most widespread processes, the acid-gas-containing fluid mixture is brought into contact with an organic solvent or an aqueous solution of an organic solvent in a gas scrubber or a liquid/liquid extraction.

An extensive patent literature also exists on such scrubbing processes and corresponding absorption solutions used in these processes. In principle, a differentiation can be made here between two different types of absorption media or solvents:

Firstly what are termed physical solvents are used, which are based on a physical absorption process. Typical physical solvents are cyclotetramethylene sulfone (sulfolane) and its derivatives, aliphatic acid amides, NMP (N-methylpyrrolidone), N-alkylated pyrrolidones and corresponding piperidones, methanol and mixtures of dialkyl ethers of polyethylene glycols (Selexol®, Union Carbide, Danbury, Conn., USA).

Secondly, chemical solvents are used, whose mode of action is based on chemical reactions in which the acid gases are converted into more easily removable compounds. For example, in the case of the aqueous solutions of alkanolamines most widely used as chemical solvents on an industrial scale, salts are formed when acid gases are passed through. The alkanolamine solution can be regenerated by heating or stripping, in which case the acid gas salts are thermally decomposed and/or stripped off by steam. After the regeneration process, the amine solution can be reused. Preferred alkanolamines used in the removal of acid gas impurities from hydrocarbon gas streams comprise monoethanolamine (MEA), diethanolamine (DEA), triethanolamine (TEA), diisopropylamine (DIPA), aminoethoxyethanol (AEE) and methyldiethanolamine (MDEA).

Primary and secondary alkanolamines are suitable in particular for gas scrubbers in which the purified gas must have a very low $CO_2$ content (for example 10 ppm$_v$ of $CO_2$). The primary and secondary alkanolamines react directly with carbon dioxide, forming soluble carbamate. In the aqueous amine solution the carbamate is in a characteristic equilibrium with bicarbonate. To regenerate the amine solution, on an industrial scale, frequently a two-stage regeneration process is used, the loaded solvent first being expanded in one or more flash columns, so that a portion of the absorbed $CO_2$ evaporates from the solution. Residual carbon dioxide and/or other absorbed acid gases are then removed by stripping with steam. Solvents which comprise primary and secondary alkanolamines require, however, a large amount of steam to decompose the carbamate and correspondingly a lot of heat energy.

European patent application EP-A 0 322 924 discloses using an aqueous amine solution which comprises tertiary alkanolamines, in particular MDEA, for deacidifying gas streams. In contrast to primary and secondary alkanolamines, tertiary alkanolamines do not react directly with carbon dioxide, since the amine is completely substituted. Rather, carbon dioxide is reacted in a slow reaction with the tertiary alkanolamine and with water to give bicarbonate. Tertiary amines are therefore suitable in particular for selective removal of $H_2S$ from gas mixtures which comprise $H_2S$ and $CO_2$. Because of the slow reaction of carbon dioxide, the scrubbing process with tertiary alkanolamine solutions must be carried out using a high liquid/gas ratio at a correspondingly high solvent recirculation rate. Therefore, attempts have been made to increase the absorption rate of carbon dioxide in aqueous solutions of tertiary alkanolamines by adding further compounds which are termed activators or promoters (DE-A-15 42 415, DE-A-1 094 428, EP-A-0 160 203).

U.S. Pat. No. 4,336,233 describes one of the currently most effective absorption liquids for removing $CO_2$ and $H_2S$ from a gas stream. This is an aqueous solution of methyldiethanolamine (MDEA) and piperazine as absorption accelerator or activator (aMDEA®, BASF AG, Ludwigshafen). The absorption liquid described there contains from 1.5 to 4.5 mol/l of methyldiethanolamine (MDEA) and from 0.05 to 0.8 mol/l, preferably up to 0.4 mol/l, of piperazine. The removal of $CO_2$ and $H_2S$ using MDEA is further described in more detail in the following patents of the applicant: U.S. Pat. No. 4,551,158; U.S. Pat. No. 4,553,984; U.S. Pat. No. 4,537,753; U.S. Pat. No. 4,999,031; CA 1 291 321 and CA 1 295 810 (EP 202 600), EP-A-190 434 (CA 1,290,553), EP-A-159 495, EP-A-359 991 (U.S. Pat. No. 4,999,031) and WO 00/00271

Since no direct bond is formed between tertiary alkanolamines and carbon dioxide, the amine solution can be regenerated very economically. In many cases flash regeneration with one or more expansion stages is sufficient. An optional additional thermal regeneration requires substantially less energy than in the case of solutions of primary or secondary alkanolamines.

Customarily, the loaded absorption liquid is expanded from a pressure prevailing in the absorption column of 10-100 bar to a pressure of 1-2 bar in a low-pressure expansion chamber or low-pressure expansion tower. U.S. Pat. No. 4,336,233 and U.S. Pat. No. 4,537,753 describe a variant of this process in which the loaded absorption liquid is expanded in a first expansion stage to a pressure of 5 bar or more and in a second expansion stage to a pressure of from 1 to 3 bar. In this case the first expansion stage is termed a medium-pressure expansion stage (high-pressure flash). Between the bottom of the absorption column and the inlet of the first expansion chamber, an expansion turbine can additionally be disposed. EP-A-0 107 783 also describes a multistage expansion process for regenerating the absorption liquid. In a first expansion stage the absorption liquid is expanded to a pressure of more than 5 bar and in a downstream second stage is expanded to a pressure of from 1 to 2 bar. In these processes, upstream of the low-pressure expansion stage, or, if a medium-pressure expansion stage is provided, between the medium-pressure and low-pressure expansion stage, a heat exchanger is disposed for heating the absorption liquid. A disadvantage in these processes is the fact that the absorption liquid coming from the bottom of the absorption tower or from the bottom of the medium-pressure expansion stage has a relatively high temperature of from 80 to 100° C. The energy input in the heat exchanger therefore takes places at a relatively high energy level.

According to another process described in the literature, the absorption liquid is regenerated in a multistage expansion process, the last expansion stage being operated at reduced pressure compared with atmospheric pressure, typically at a pressure of from 0.5 to 0.8 bar (absolute) (EP-A-0 121 109, EP-A-0 159 495, CA 1,295,810, CA 1,290,553). This process also has economic disadvantages, since in industrial use high compressor ratings are required of the pumps used to generate the vacuum and operating the pumps is a further cost factor.

It is an object of the present invention, therefore, to provide an improved process for deacidifying a fluid hydrocarbon stream in which the absorption liquid can be economically regenerated.

We have found that this object is achieved by the process according to claim 1. The present invention therefore relates to a process for deacidifying a fluid hydrocarbon stream which comprises $CO_2$ and/or other acid gases as impurities in which the fluid stream is brought into intimate contact with an absorption liquid in an absorption or extraction zone, so that $CO_2$ and other acid gases present in the fluid stream are absorbed by the absorption liquid, the substantially purified fluid stream and the absorption liquid which is loaded with $CO_2$ and/or other acid gases are separated from one another, and the absorption liquid is subsequently regenerated and then again fed to the absorption or extraction zone. According to the invention, the absorption liquid is regenerated by expanding the loaded absorption liquid to a pressure of from 1 to 2 bar (absolute) in a first low-pressure expansion stage, so that a portion of the gases present in the absorption liquid can evaporate, then heating the partially regenerated absorption liquid and then expanding to a pressure of from 1 to 2 bar (absolute) in a second low-pressure expansion stage.

According to the invention, therefore, it is proposed that the absorption liquid is expanded in two separate expansion steps, in each case to a pressure which is only slightly above atmospheric pressure and is preferably from 1.1 to 1.5 bar (absolute). Particularly advantageously, the pressure in both low-pressure expansion stages is essentially the same. Between the first and second low-pressure expansion stages the absorption liquid is heated in order to compensate at least partially for the energy loss occurring in the first expansion stage. Since expansion is performed to a pressure of from 1 to 2 bar as soon as in the first low-pressure expansion stage, the absorption liquid before heating is cooler than in the processes known from the prior art. Typically, the heating is performed in a heat exchanger at an absorption liquid inlet temperature of from 60 to 85° C. The heat energy is therefore fed at a lower energy level, which leads to an improved overall efficiency. In previously known processes in which the absorption liquid is heated before entry to the low-pressure expansion stage, heating of the entire mass stream is necessary, that is to say of the absorption liquid and virtually all of the absorbed acid gas. In contrast thereto, in the inventive process, the acid gas already released in the first low-pressure extension stage need no longer be heated.

Advantageously, for the expansion, expansion vessels or expansion chambers are used which can also be constructed as columns. The expansion vessels can be free from special internals. However, internals, for example columns equipped with packings, can also be used. When an expansion column is used, the partially regenerated absorption liquid is taken off at the bottom of the first column and passed into the heat exchanger. The heated absorption liquid is then passed into the top region, preferably into the upper third, of the expansion column of the second expansion column. From the bottom of the second expansion column, the regenerated absorption liquid is passed back to the top of the absorption column. Before entry into the absorption column, an additional heat exchanger can be disposed, which cools the absorption liquid in order to increase the loading capacity with acid gases in the subsequent scrubbing process.

The heating of the partially regenerated absorption liquid after passage through the first low-pressure expansion stage and the expansion in the second low-pressure expansion stage can also be effected by an expansion device and a separate heat exchanger. Heating and second expansion, however, can also be carried out in an integrated device, for example in a heat exchanger equipped with degassing. Particularly preferably, a horizontal heat exchanger is used, in which the heating of the absorption liquid and the release of the acid gases in the second expansion process can be performed simultaneously, for example a horizontal thermosyphon. The absorption liquid outlet temperature is then advantageously below the boiling temperature of the lowest-boiling component of the unloaded absorption liquid at a given operating pressure.

The gas released in the two expansion stages consists chiefly of $CO_2$. Entrained water and residues of amines can be fed back via reflux condensers to the absorption medium circuit or the absorption column. The gases taken off at the top of the first and second low-pressure expansion stages are therefore advantageously passed via condensers, for example reflux condensers. A separate reflux condenser can be assigned here to each low-pressure expansion stage. Preferably, however, the gases released in the first and second expansion stages are taken off via a shared condenser.

If a heat exchanger equipped with degassing is used in the second expansion stage, the gas released can also be returned to the bottom of the first expansion stage.

The gas taken off via the condensers, after any adsorption of residual traces of amine has been carried out, consists of high-purity food quality $CO_2$, which can be further processed accordingly.

According to a variant of the inventive process, at least one medium-pressure expansion stage (high-pressure flash)

can be provided upstream of the first low-pressure expansion stage, in which medium-pressure expansion stage the loaded absorption liquid which is taken off from the absorber bottom is first expanded to a pressure of greater than or equal to 3 bar (absolute), typically from 5 to 8 bar (absolute).

A particular advantage of the inventive process is that $CO_2$ and also a relatively large amount of other acid gases, such as $H_2S$, can be removed to a sufficient extent from the absorption liquid using the two low-pressure expansion stages proposed according to the invention, so that the absorption liquid is regenerated without further thermal treatment, that is to say without any additional strippers (stripping columns). Depending on the contamination of the treated fluid hydrocarbon stream with other acid gases, however, it can be advantageous to regenerate the absorption liquid after expansion using a stripper. For example, other acid gases present in the absorption liquid, such as $H_2S$ or COS, and residues of $CO_2$, can be removed by stripping with steam or nitrogen.

The inventive process can be carried out using the most varied absorption liquids, aqueous amine solutions which comprise at least one amine being preferred as absorption liquids. Particularly preferably, alkanolamines, such as monoethanolamine, diethanolamine, triethanolamine, diisopropanolamine, aminoethoxyethanol, etc., are used. Very particularly preferably, the absorption liquid comprises methyldiethanolamine (MDEA), dimethylethanolamine or piperazine, as individual components or as a mixture of two or three of these components.

Generally, from 1.5 to 6 mol of amine are used per l of absorption liquid, preferably from 2 to 5 mol/l, and in particular from 3.0 to 4.5 mol/l.

When a tertiary amine is used, an activator, in particular piperazine or a derivative thereof, can be used. The activator is generally used in an amount of from 0.05 to 3 mol, in particular from 0.1 to 2 mol, per l of absorption liquid.

Particularly preferably, methyldiethanolamine is used together with piperazine. The amount of methyldiethanolamine in this case is from 30 to 70% by weight, in particular from 35 to 60% by weight, or from 40 to 60% by weight, and particularly preferably from 45 to 55% by weight, based on the weight of absorption liquid. The amount of piperazine is such that the weight ratio of methyldiethanolamine to piperazine is from 9 to 15, preferably from 11 to 15.

The present invention is described in more detail below with reference to an example shown in the accompanying drawings. The example relates to a gas scrubber. Regeneration of absorption liquid used in the liquid/liquid extraction (for instance in an LPG scrubber) proceeds correspondingly, however.

Figure 6:
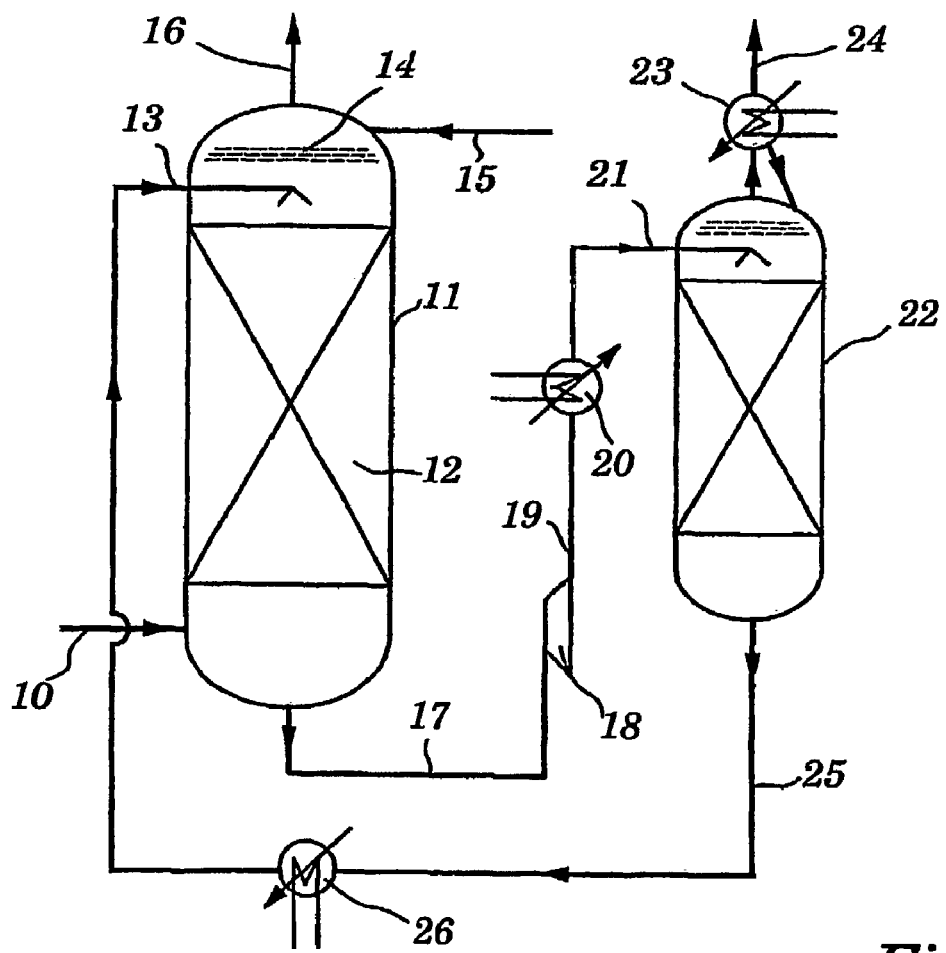
FIG. 6 shows a diagrammatic representation of the process sequence of a gas scrubber according to the prior art.

First, with reference to FIG. 6, the principle of the process sequence of a gas scrubber according to the prior art is explained. A fluid mixture, which can contain, for example, natural gas as product of value, and in addition comprises $CO_2$ and, if appropriate, other acid gases such as $H_2S$ or COS, is passed via a feed line 10 to an absorption column 11. Before entry into the absorption column, separation devices (not shown) can be provided which remove, for example, liquid droplets from the crude gas. The absorption column 11 has an absorption zone 12, in which intimate contact is ensured of the acid crude gas with an absorption liquid low in acid gases, which passes via a feed line 13 to the top region of the absorption column 11 and is conducted in countercurrent to the gas to be treated. The absorption zone 12 can be implemented, for example, by plates, for instance sieve plates of bubble cap plates, or by packings. Typically, from 20 to 34 plates are used. In the top region of the absorption column 11, from 1 to 5 backwash plates 14 can be disposed, in order to decrease the loss of easily volatile constituents of the absorption liquid. The backwash plates 14 constructed, for example, as bubble cap plates are fed via a condensate line 15 with water, through which the treated gas is passed. The gas stream which is substantially freed from acid gas constituents leaves the absorption column 11 via a top takeoff 16. In the line 16, a separator (not shown) can be disposed, in particular if no backwash plates are provided in the column 11, which separator removes entrained absorption liquid from the gas stream.

Figure 2:
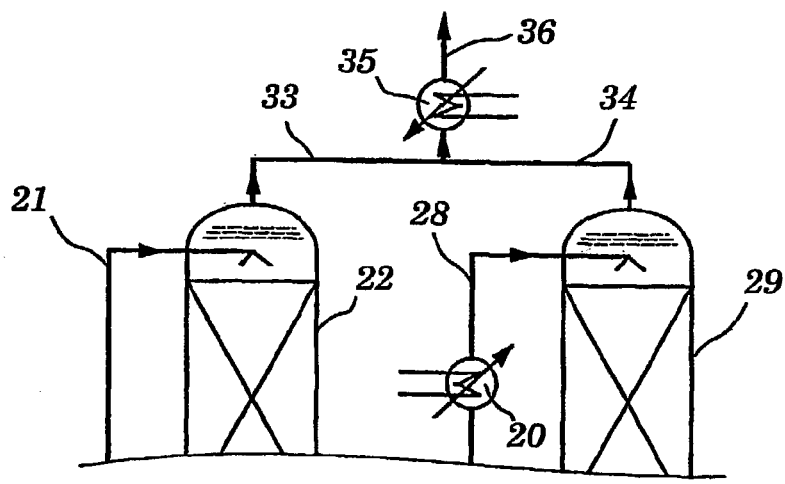
FIG. 2 shows a detail of a variant of the process of FIG. 1.

Instead of the single-stage absorption device described here, a two-stage variant can also be used, as depicted, for example, in FIG. 2 of U.S. Pat. No. 4,336,233.

In the absorption column there typically prevails a pressure of from 1 to 120 bar (absolute), preferably from 10 to 100 bar. The absorption liquid is passed into the column top at a temperature of from 40 to 70° C. and taken off at the column bottom at from 50 to 100° C.

The acid-gas-containing absorption liquid leaves the absorption column 11 via a line 17 and passes via an optionally provided expansion turbine 18 and a line 19 into a heat exchanger 20, in which the absorption liquid is heated by from 5 to 30° C. Between the adsorption column 11 and the heat exchanger 20, or between the expansion turbine 18 and the heat exchanger 20, there can be disposed one or more medium-pressure expansion columns (not shown here), in which the absorption liquid is expanded from a higher pressure to a lower pressure of typically more than 3 bar (absolute). The medium-pressure expansion columns serve, primarily, not for regenerating the absorption liquid, but for higher purity of the acid gas, which is achieved via an upstream release of inert gases in the medium-pressure expansion columns. An example of a gas scrubber in which the absorption liquid is regenerated in a medium-pressure expansion column and a downstream low-pressure expansion column is described, for example, in U.S. Pat. No. 4,537,753.

The loaded absorption liquid is fed via a line 21 into the top region of an expansion column 22. In the example shown, at the top of the expansion column 22 there is provided a heat exchanger with top distributor or condenser 23 which feeds back entrained droplets of the absorption liquid to the expansion column. Via the line 24, released acid gas is taken off which, if appropriate after removing residual traces of amine, is present as high-purity gas and can be used, for example in the absence of sulfur compounds, as pure $CO_2$ (food grade) in the food industry. The regenerated absorption liquid leaves the expansion column 22 via a line 25 and is fed back via a pump (not shown) and a heat exchanger 26 which may optionally be provided to cool the absorption liquid, via the line 13, to the top region of the absorption column 11. Between the expansion column 22 and the absorption column 11, one or more strippers (stripping columns, not shown here) can also be disposed, in which the absorption liquid is conducted in countercurrent to a gas stream, for example steam or nitrogen, in order to remove residual acid gas constituents from the absorption liquid.

Figure 1:
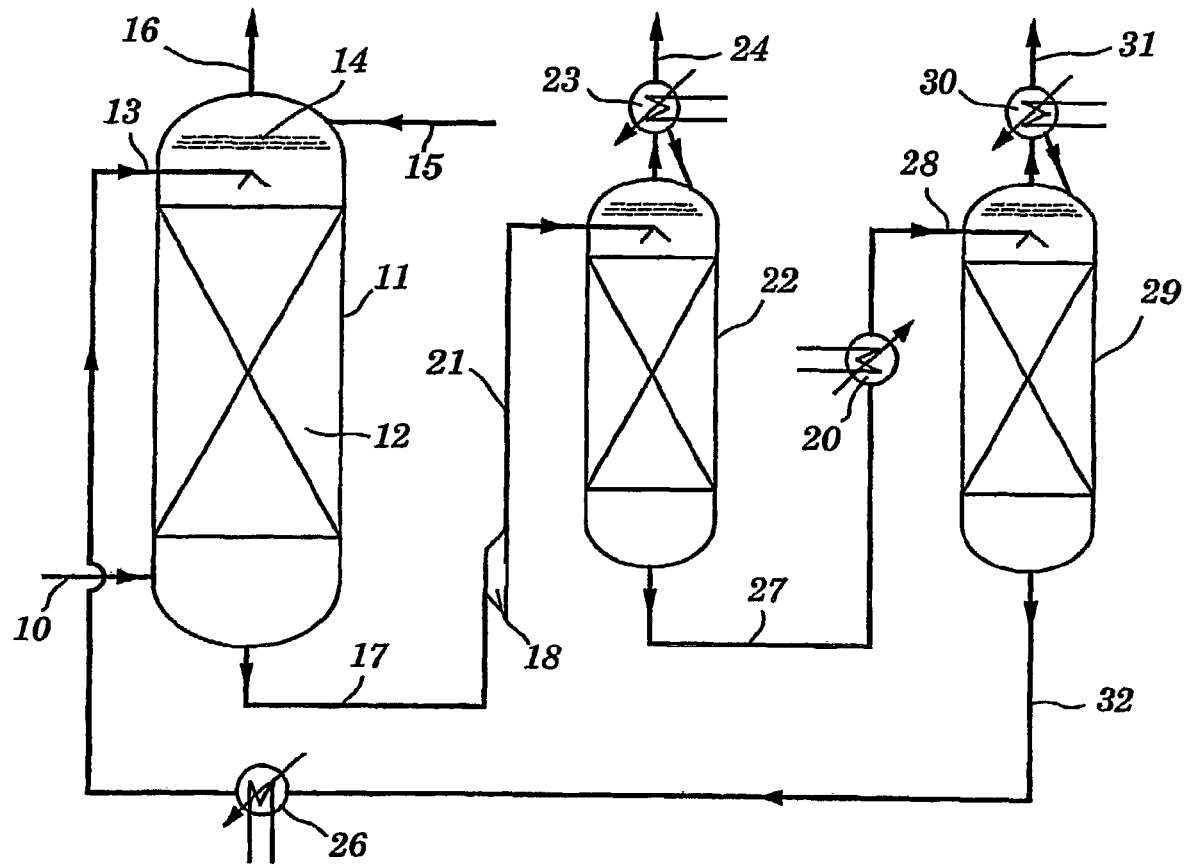
FIG. 1 shows a diagrammatic representation of the process sequence of a preferred embodiment of the inventive gas scrubber.

Referring to FIG. 1, the process sequence of a first variant of the inventive gas scrubbing process is now explained in more detail. The actual gas scrubbing corresponds to the process which is known per se, already explained in connection with FIG. 6, where in FIG. 1 elements which correspond to those already described in FIG. 6 are given the same reference numbers. Acid-gas-containing crude gas is again passed via a line 10 into the absorption column 11 where it is brought into intimate contact with a absorption liquid. The absorption liquid is taken off via the line 17 in the bottom of the absorption column 11 and passed via an optionally present expansion turbine 18 to the top region of a first low-pressure expansion column 22. In the expansion column 22, the absorption liquid is expanded to a pressure which essentially corresponds to atmospheric pressure or which is only slightly, about 1 bar, above it. The absorption liquid is not heated before entry into the first absorption column. The gases released during the expansion process, in particular $CO_2$, are taken off from the top region of the column via the condenser 23 and the line 24. The partially regenerated absorption liquid passes via a line 27 into a heat exchanger 20 and is heated there before it flows via a line 28 into the top region of a second low-pressure expansion column 29. In the second column 29, the absorption liquid is again expanded to a pressure of from 1 to 2 bar (absolute), with further gas fractions being able to evaporate from the absorption liquid. The gas is again, after passage through a reflux condenser 30, taken off from the top region of the column 29 via a line 31. The regenerated absorption liquid passes via a line 32 and an optionally provided heat exchanger 26 via the line 13 back into the top region of the absorption column 11. By means of the heat exchanger 26, the temperature of the absorption liquid can be decreased prior to entry into the absorption column 11.

FIG. 2 shows a variant of the process shown in FIG. 1. Instead of the reflux condensers 23,30 provided in FIG. 1 for each expansion column 22,29, the gases taken off from the top regions of the columns 22,29 are conducted via lines 33,34 to a shared reflux condenser 35, from which they are removed via a line 36.

Figure 3:
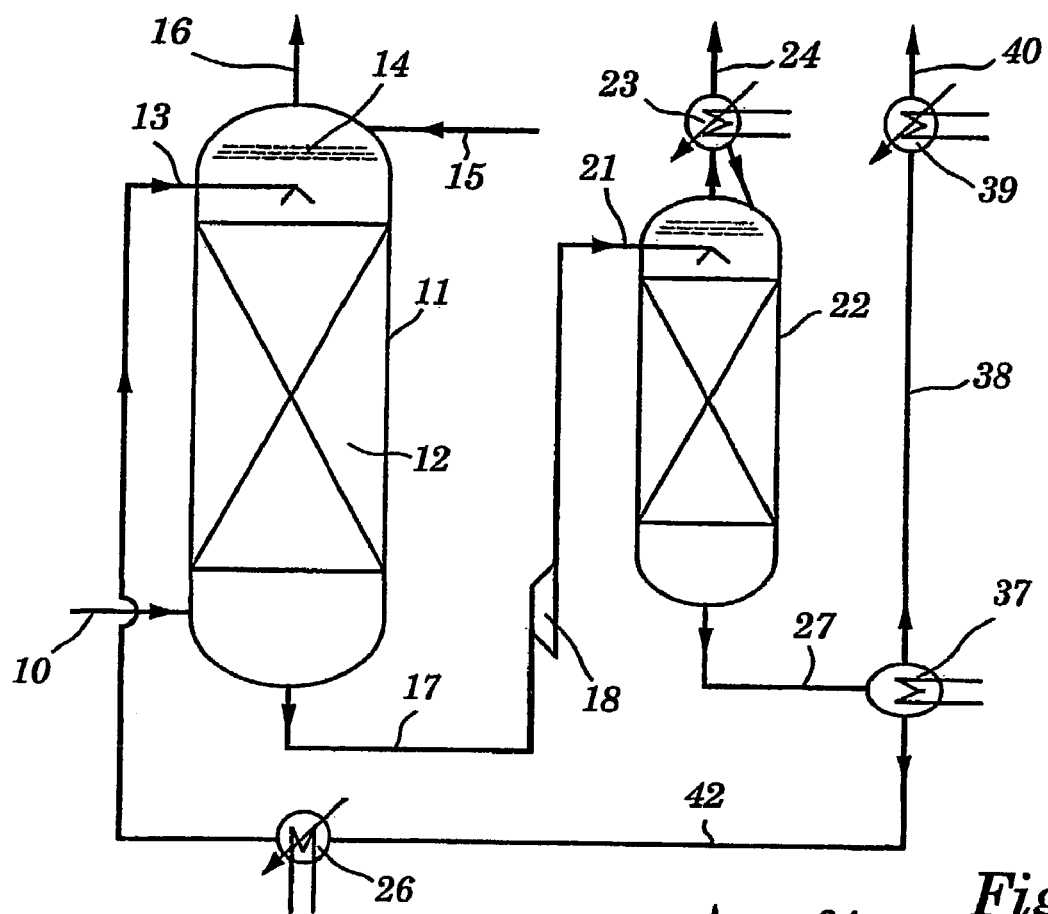
FIG. 3 shows a second preferred embodiment of the inventive process.
Figure 4:
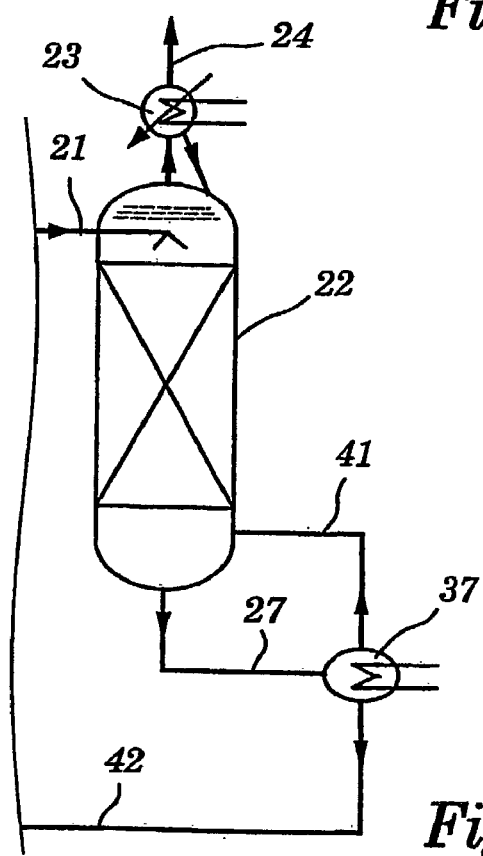
FIG. 4 shows a detail of a variant of the process of FIG. 3.

FIGS. 3 and 4 show a further embodiment of the inventive process in which the heating of the absorption liquid and the second expansion stage are implemented by a degassing-equipped heat exchanger 37. In this the absorption liquid is firstly heated and secondly acid gas is released. The gases released in this case are, in the variant of FIG. 3, passed via a line 38 into a reflux condenser 39 and from there are taken off via a line 40. According to the variant of FIG. 4, the gases released in the heat exchanger 37 are passed back via a line 41 to the bottom region of the first expansion column 22. In both cases the regenerated absorption liquid passes via the line 42 and an optionally provided heat exchanger 26 and the line 13 back to the top region of the absorption column 11.

Figure 5:
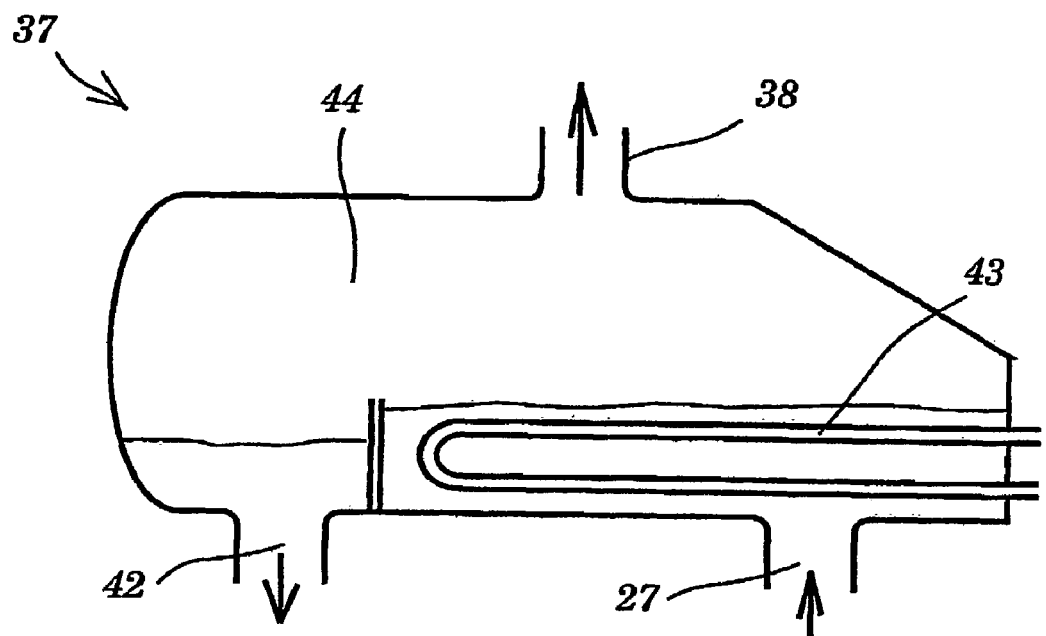
FIG. 5 shows a diagrammatic representation of a heat exchanger operating by the thermosyphon principle.

The degassing-equipped heat exchanger 37 used in the process variants of FIGS. 3 and 4 is preferably a horizontal thermosyphon, as shown in detail in FIG. 5 (again the same reference numbers have been used for elements already described in FIGS. 3 and 4). The partially regenerated absorption liquid passes via the line 27 into the heat exchanger 37 where it is brought into contact with a U-shaped tube 43, through which flows a heat-exchange medium, and is in part vaporized. In the space 44 of the heat exchanger 37 there is thus produced a liquid/vapor mixture. The $CO_2$ released and residual acid gas constituents are taken off via line 38, while the regenerated absorption liquid leaves the heat exchanger 37 via line 42.

EXAMPLE

A feed gas consisting of 19% (v/v) $CO_2$, 1% (v/v) oxygen, 70% (v/v) methane and 10% (v/v) ethane is to be purified by an amine scrubber to the extent that the residual $CO_2$ content in the purified gas is 2.5% (v/v).

Amine scrubbing is carried out using a piperazine-activated 40% strength aqueous MDEA solution as absorption liquid.

In a comparative example, the absorption liquid is regenerated in a process according to FIG. 6 (without expansion turbine) using a heat exchanger (rich liquor heater), a low-pressure expansion column with reflux condenser (low-pressure flash) and a cooler for the regenerated absorption liquid.

The inventive process using two low-pressure expansion stages is carried out not only according to the variant of FIG. 1, but also according to the variant of FIG. 3, in each case no expansion turbines being provided.

Experiments with a fixed circulation rate of absorption liquid:

In the variant of FIG. 1, the energy input is 6.4% lower than in the process variant of the prior art according to FIG. 6. In the case of the inventive process according to FIG. 4, in which the gas released in the heat exchanger 37 is fed back to the bottom of the first expansion column, the energy savings are as much as 13.5%.

When separate reflux condensers are used, the inventive process produces 36% high-purity $CO_2$ in food grade quality.

Process procedure using a fixed energy input:

If the energy introduced by the heat exchanger 20 is the same in all process variants, it is observed that to achieve the required specification of 2.5% residual $CO_2$, in the process of the prior art, a solvent circulation rate higher by 4.4% and a cooling capacity higher by 4.35% are required.

We claim:

1. A process for deacidifying a fluid hydrocarbon stream which comprises $CO_2$ and/or other acid gases as impurities, in which the fluid stream is brought into intimate contact with an absorption liquid in an absorption or extraction zone, the substantially purified fluid stream and the absorption liquid loaded with $CO_2$ and/or other acid gases are separated from one another, and the absorption liquid is subsequently regenerated and then again fed to the absorption or extraction zone, which comprises, to regenerate the absorption liquid,
(a) expanding the loaded absorption liquid in a first low-pressure expansion stage to a pressure of from 1.1 to 2 bar (absolute),
(b) heating the partially regenerated absorption liquid in the first low-pressure expansion stage and liquid in the first low-pressure expansion stage, and
(c) again expanding the partially regenerated absorption liquid in a second low-pressure expansion stage to a pressure of from 1.1 to 2 bar (absolute),
wherein the pressure in (a) is essentially the same as the pressure in (c).

2. A process as claimed in claim 1, wherein the absorption liquid is expanded in the first and second low-pressure expansion stages to a pressure of from 1.1 to 1.5 bar (absolute).

3. A process as claimed in claim 1, wherein the steps (b) and (c) are carried out in a degassing-equipped heat exchanger.

4. A process as claimed in claim 1, wherein the gases released in the first and second expansion stages are taken off via separate condensers.

5. A process as claimed in claim 1, wherein the gases released in the first and second expansion stages are taken off via a shared condenser.

6. A process as claimed in claim 3, wherein the gases released in the heat exchanger are fed back to the first expansion stage.

7. A process as claimed in claim 1, wherein the absorption liquid is expanded to a pressure of at least 3 bar in at least one medium-pressure expansion stage upstream of the first low-pressure expansion stage.

8. A process as claimed in claim 1, wherein the absorption liquid, after the expansion, is regenerated by stripping with nitrogen or steam.

9. A process as claimed in claim 1, wherein the absorption liquid used is an aqueous amine solution.

10. A process as claimed in claim 9, wherein an absorption liquid is used which comprises methyldiethanolamine or dimethylethanolamine or a mixture thereof.

11. A process as claimed in claim 10, wherein tan absorption liquid is used which additionally comprises piperazine.

12. A process as claimed in claim 11, wherein the absorption liquid comprises from 30 to 70% by weight of methyldiethanolamine and piperazine in an amount such that the weight ratio of methyldiethanolamine to piperazine is from 9 to 15.

13. A process as claimed in claim 12, wherein the absorption liquid comprises from 35 to 60% by weight of methyldiethanolamine.

14. A process as claimed in claim 11, wherein the absorption liquid comprises from 45 to 55% by weight of methyldiethanolamine and piperazine in an amount such that the weight ratio of methyldiethanolamine and piperazine is from 11 to 15.

15. A process as claimed in claim 12, wherein the absorption liquid comprises from 45 to 55% by weight of methyldiethanolamine and from 3 to 4% by weight of piperazine.

* * * * *